Sept. 24, 1968         G. LJUNGSTRÖM         3,402,782
MOTOR VEHICLE DRIVING UNIT AND SUSPENSION MEANS FOR THE SAME
Filed May 9, 1966         4 Sheets-Sheet 1
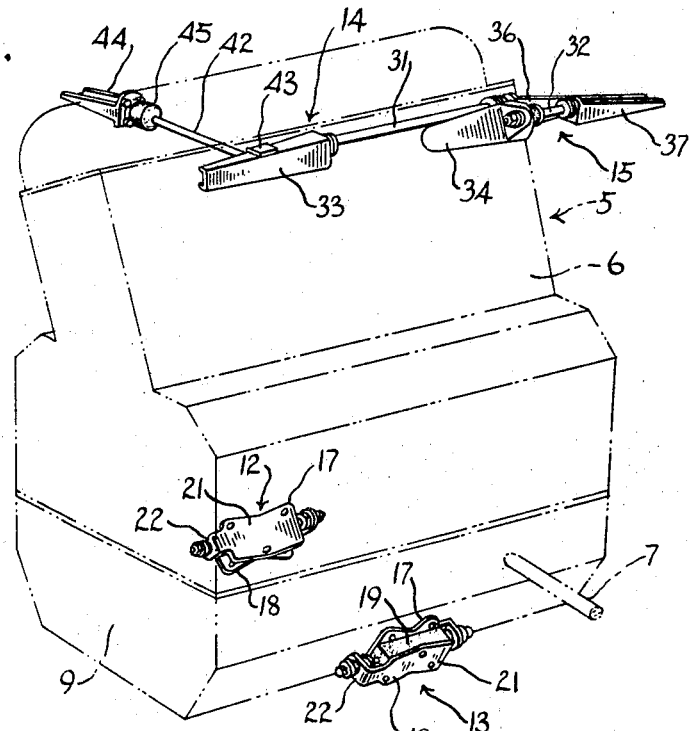
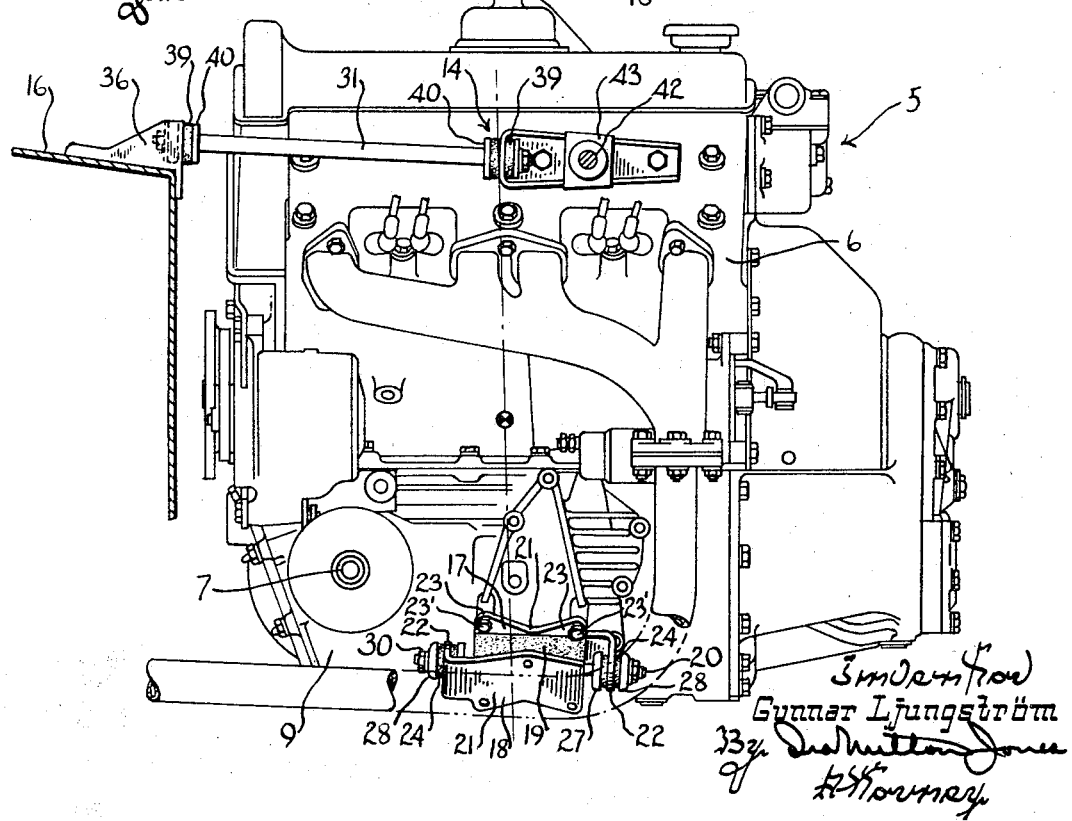

Sept. 24, 1968  G. LJUNGSTRÖM  3,402,782
MOTOR VEHICLE DRIVING UNIT AND SUSPENSION MEANS FOR THE SAME
Filed May 9, 1966  4 Sheets-Sheet 2

Inventor
Gunnar Ljungström

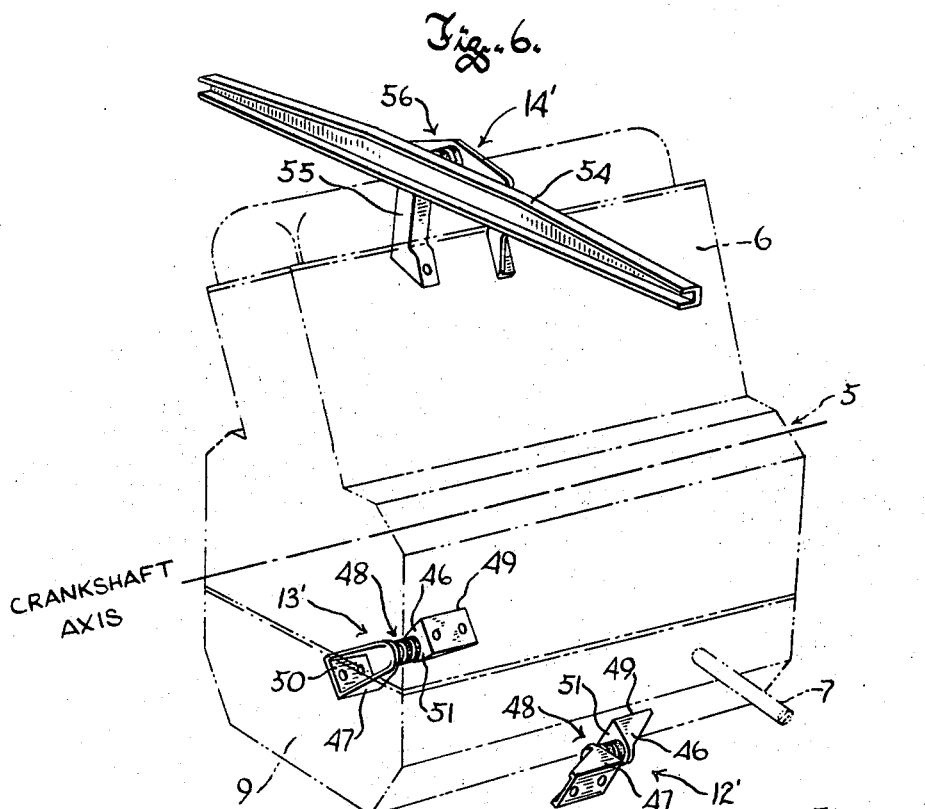
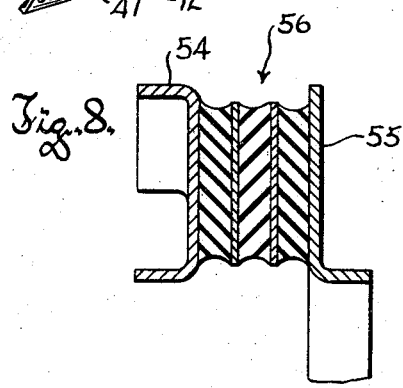
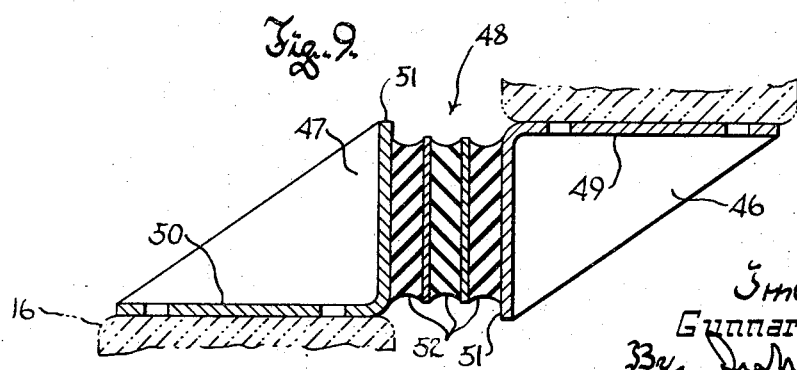

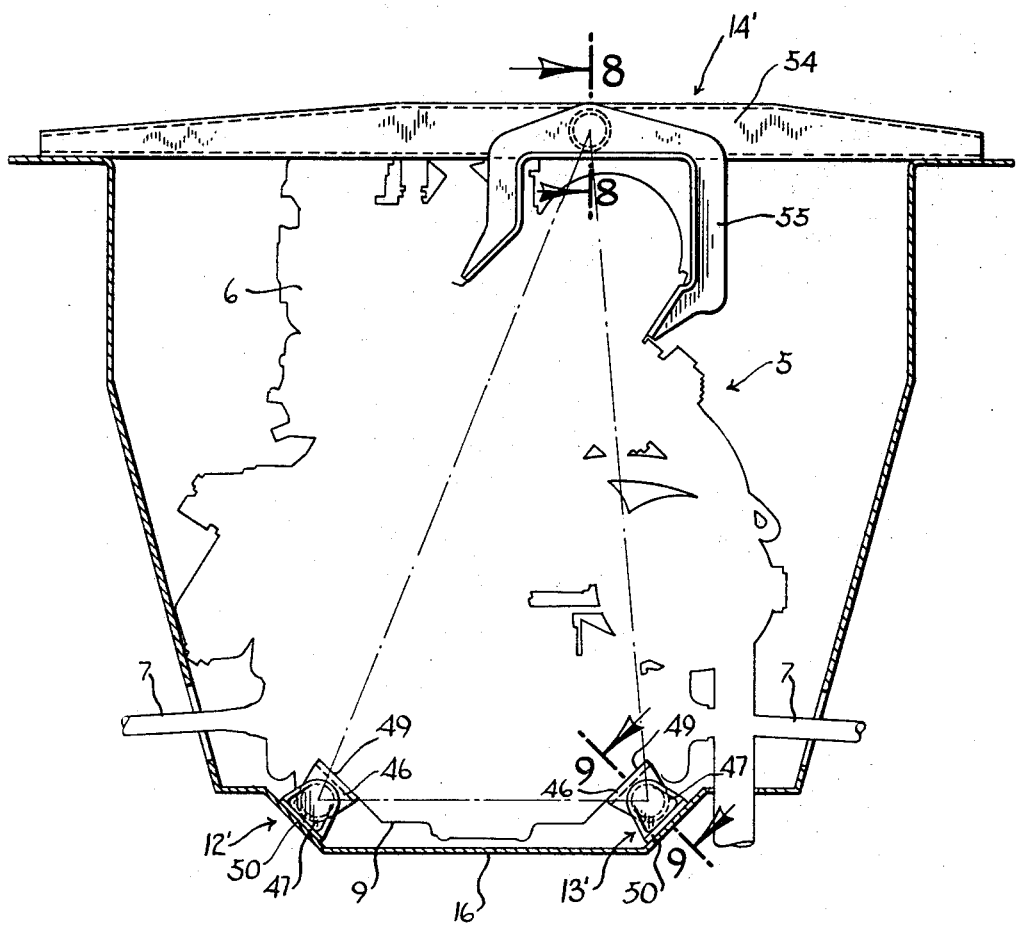

United States Patent Office

3,402,782
Patented Sept. 24, 1968

3,402,782
MOTOR VEHICLE DRIVING UNIT AND SUSPENSION MEANS FOR THE SAME
Gunnar Ljungström, Trollhattan, Sweden, assignor to Saab Aktiebolag, Linkoping, Sweden, a corporation of Sweden
Filed May 9, 1966, Ser. No. 548,576
Claims priority, application Sweden, May 11, 1965, 6,105/65
7 Claims. (Cl. 180—64)

ABSTRACT OF THE DISCLOSURE

Suspension means for a motor vehicle driving unit comprising an engine having a crankshaft and a transmission having output drive shafts transverse to the crankshaft in which elastic means supports the driving unit for relative freedom of movement about the crankshaft and bracing means precludes relative movement of the driving unit about the drive shafts.

---

This invention relates to motor vehicle driving units of the type comprising an engine and a transmission for a vehicle having driving wheels positioned at opposite sides of the driving unit, and the invention refers more particularly to an arrangement of such a driving unit and suspension means for the same by which transmission of vibrations and oscillations from the driving unit to the body of the vehicle in which it is mounted is substantially minimized.

In automotive vehicles of the front-engine front wheel drive type and rear-engine rear wheel drive type, the engine is usually an element of a driving unit that also comprises a transmission, a differential, and output drive shafts that are connected with driving wheels of the vehicle. In the driving units with which the present invention is concerned, the engine is of the reciprocating internal combustion type and has a crankshaft which is rotatable on an axis that extends parallel to the longitudinal axis of the vehicle. The output drive shafts project laterally in opposite directions from the driving unit, with their axes substantially transverse to that of the crankshaft. Through universal joints or the like the drive shafts are connected with driving wheels positioned at opposite sides of the driving unit. The transmission serves to transmit torque from the crankshaft to the output drive shafts and of course provides for variation of the ratio of crankshaft speed to drive shaft speed to accommodate the varying conditions under which the vehicle is operated.

It is well known that oscillations and vibrations of various kinds are produced by the operation of a vehicle driving unit. To minimize the transmission of these oscillations and vibrations to the body of the motor vehicle in which the driving unit is installed, the driving unit is usually supported on the body by suspension means which provide for some degree of movement of the driving unit relative to the body.

The vibration and oscillation forces which act upon a driving unit of the type here under consideration and which must be accommodated by its suspension means arise mainly from three sources, namely, engine vibrations, reactions to variations in crankshaft torque, and reactions to variations in output drive shaft torque.

As a reciprocating internal combustion engine operates, it produces torque reaction impulses which tend to turn the main bulk of the engine about an axis that coincides with or parallels the crankshaft axis. It has been conventional to mount motor vehicle engines on resilient suspension means which permit the engine to have a substantial degree of motion in the direction in which it tends to be turned by such torque reaction forces, but which yieldingly resist such motion, to thereby minimize the transmission to the vehicle body of oscillations due to such torque reaction forces. To the extent that the engine may not be in full dynamic balance, such suspension means also reduced the transmission to the vehicle body of engine vibrations due to such unbalance.

In driving units of the type here under consideration it has heretofore been conventional to locate the transmission at one end of the engine, so that the center of gravity of the driving unit was spaced some distance axially from the longitudinal center of the crankshaft. The present invention is in part based upon a recognition that this heretofore conventional arrangement had a serious disadvantage. The torque and dynamic unbalance forces which act upon the engine to produce oscillations and vibrations have their effective centers at a point on or near the longitudinal center of the crankshaft, and where the center of gravity of the driving unit was spaced some distance from this point, reaction couples were set up that tended to produce oscillations around an axis parallel to the drive shafts.

Torque reaction forces that arise from the driving wheels require that the mounting for the driving unit be stiff enough to carry the major portion of these wheel torque reaction forces into the vehicle body but must nevertheless permit the driving unit to have some freedom of movement in response to oscillations in a plane perpendicular to the crankshaft.

The oscillation and vibration forces about axes parallel to the drive shaft axis, from both of the sources mentioned above, could not be satisfactorily accommodated by prior driving unit suspensions, which were arranged to support the driving unit at its front and rear. In order to resist the torque reaction forces from the driving wheels, such prior suspensions had to have substantial stiffness, and therefore transmitted a considerable amount of vibration in a vertical and transverse direction from the driving unit to the vehicle body. In many cases, too, the space available in the driving unit compartment of the vehicle imposed practical limitations upon the amount of freedom that the driving unit could be allowed for motion about axes parallel with the output drive shafts.

With the foregoing considerations in mind it is the general object of the present invention to provide an improved arrangement of a driving unit of the character described and the suspension means by which such driving unit is carried in a vehicle body, by which arrangement there is achieved a minimum of transmission of vibration from the driving unit to the vehicle body.

More specifically it is an object of the present invention to provide an arrangement of a driving unit of the character described and its suspension means whereby the several forces that act upon the driving unit to respectively produce and resist oscillations and vibrations are caused to act upon it substantially in a single plane perpendicular to the crankshaft axis, so that such forces tend to move the driving unit substantially only in directions parallel to said plane, and whereby the driving unit is so connected to a vehicle body that it is supported at points located substantially on said plane and allowed substantial freedom for motions in directions parallel to said plane while being substantially confined against motion in other directions, to thus permit vibration and oscillation forces acting upon the driving unit to be dissipated in motion of the driving unit relative to the vehicle body substantially without transmission of such forces to the vehicle body.

Another object of this invention is to provide simple but very effective suspension means for a driving unit of the character described.

With the above and other objects in view which will appear as the description proceeds, this invention resides in the novel construction, combination and arrangement of parts substantially as hereinafter described and more particularly defined by the appended claims, it being understood that such changes in the precise embodiments of the herein disclosed invention may be made as come within the scope of the claims.

The accompanying drawings illustrate several complete examples of physical embodiments of the invention constructed according to the best modes so far devised for the practical application of the principles thereof, and in which:

FIGURE 1 is a diagrammatic perspective view of a driving unit and suspension means for supporting the same in a motor vehicle, embodying the principles of this invention;

FIGURE 2 is a view in side elevation of the driving unit and suspension means shown in FIGURE 1;

FIGURE 6 is a diagrammatic perspective view similar to FIGURE 1 but illustrating a modified embodiment of the invention;

FIGURE 7 is a view in rear elevation of the FIGURE 6 embodiment of the invention;

FIGURE 8 is a sectional view taken on the plane of the line 8—8 in FIGURE 7; and FIGURE 9 is a sectional view taken on the plane of the line 9—9 in FIGURE 7.

Figure 3:
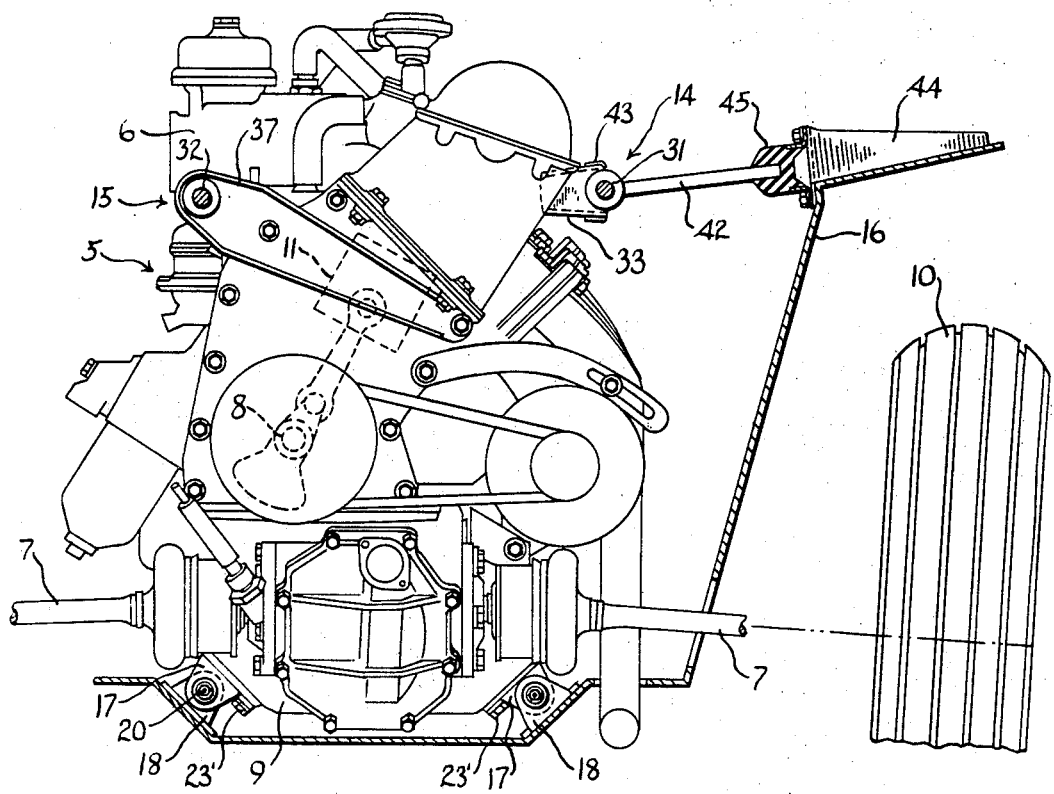
FIGURE 3 is a view in rear elevation of the driving unit and suspension means of FIGURES 1 and 2.
Figure 4:
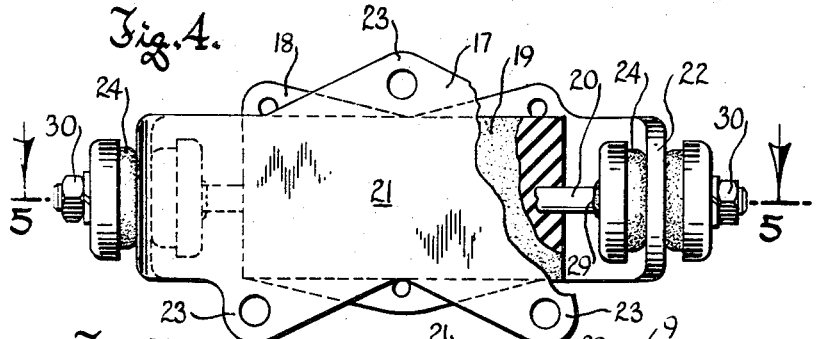
FIGURE 4 is a view on a larger scale of a lower suspension member illustrated in FIGURES 1–3, looking at the same from the side of the driving unit and obliquely upwardly.
Figure 5:
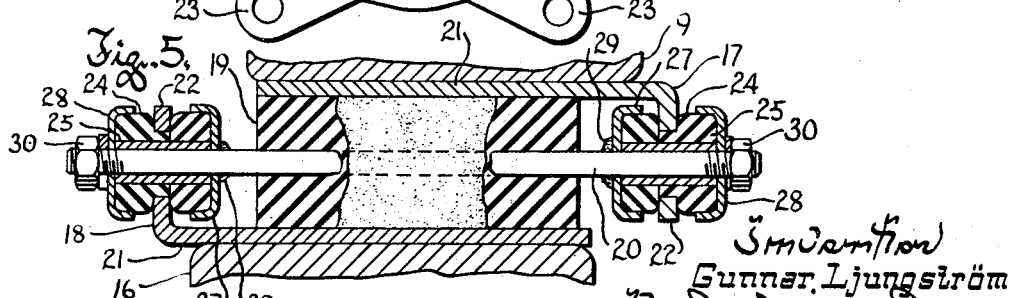
FIGURE 5 is a sectional view taken on the plane of the line 5—5 in FIGURE 4.

Referring now more particularly to the accompanying drawings, the numeral 5 designates generally a driving unit embodying the principles of this invention and which comprises, in general a reciprocating internal combustion engine 6, a pair of output drive shafts 7 which project to opposite sides of the driving unit and have their axis substantially transverse to that of the crankshaft 8 of the engine, and a transmission or gear box 9 which is rigidly attached to the engine. The details of the transmission 9, which transfers power from the crankshaft 8 to the output drive shafts 7, are well known in this art, and it is therefore illustrated only diagrammatically. Those skilled in the art will also understand that the driving unit can further comprise a differential which, so far as the present invention is concerned, may be regarded as part of the transmission 9.

The output shafts 7 are suitably connected, as by means of universal joints (not shown), with driving wheels 10 of a vehicle, positioned at opposite sides of the driving unit. The driving wheels can be the rear wheels, in the case of a rear-engine vehicle, or the front wheels in the case of a front wheel drive vehicle.

It is a feature of the driving unit of the present invention that the transmission 9 is so arranged with respect to the engine 6 that the center of gravity of the driving unit is located on or in the near vicinity of a plane perpendicular to the crankshaft axis and intersecting the longitudinal center of the crankshaft, i.e., near the center of gravity of the pistons 11 of the engine. To this end at least a portion of the transmission 9 must be disposed radially opposite the crankshaft. Preferably the transmission is located substantially entirely below the engine, but it will be appreciated that location of the center of gravity of the driving unit in the position just described can be achieved with other arrangements of the transmission wherein only a portion thereof is radially opposite the crankshaft.

With the center of gravity of the driving unit in the location described above, it will be apparent that the vibration and oscillation forces of the engine due to reaction to crankshaft torque and to any dynamic unbalance, will tend to move the driving unit substantially only in directions parallel to the above mentioned plane.

Another important feature of the invention concerns means for so suspending the driving unit from the body of an automotive vehicle as to provide the driving unit with a certain amount of freedom for motion in directions parallel to the plane just mentioned while confining it against motion in other directions, and by which there is transmitted to the vehicle body a minimum of the vibrations and oscillations due to operation of the driving unit.

It will be understood that the driving unit may be suspended from the frame portion of a vehicle having separate but rigidly connected body and frame portions, or from the body portion of a vehicle having so-called unit-body construction; hence the term "body" is herein employed to designate the entire structure comprising the body portion together with its frame portion, whether the frame portion is integral with or separate from the body portion.

The suspension means of this invention by which the driving unit is carried in the vehicle body must perform two functions, namely, it must permit but yieldingly resist motion of the driving unit relative to the body in directions parallel to the plane above mentioned, and it must substantially rigidly resist such motion of the driving unit in other directions. In the embodiment of the invention illustrated in FIGURES 1–5 these functions are respectively performed by elastic elements and by rigid elements that are articulatedly connected between the body and the driving unit. In the embodiment of the invention shown in FIGURES 6–9 both functions are performed by resilient elements which are so arranged as to resist elastic deformation in both directions along axes parallel to the crankshaft axis but to yield in other directions, and hence such elements in the FIGURES 6–9 embodiment comprise both articulating rigid and elastically resilient means, as will appear more clearly as the description proceeds.

The means for permitting but yieldingly resisting relative motion of the driving unit in directions parallel to the above mentioned plane must be connected with the driving unit at locations spaced to opposite sides of a vertical plane through the crankshaft axis, because they support the weight of the driving unit as well as yieldingly opposing its angular displacement about the crankshaft axis. They must also be connected with the driving unit at locations on or near the above mentioned plane normal to the crankshaft axis so that movement of the driving unit in response to oscillation and vibration producing forces creates no couples about the connection points of the resilient means. The substantially rigid means must provide articulating connections with the driving unit and the vehicle body to permit the desired freedom of motion of the driving unit; and their connections with the driving unit should be located at three spaced apart locations thereon which define the points of a triangle seen from along the crankshaft axis, so that they will be effective in confining the driving unit to motion in directions parallel to the above mentioned plane.

In the embodiment of the invention illustrated in FIGURES 1–5, the suspension means for the driving unit 5 comprises a pair of lower suspension members 12 and 13 and a pair of upper bracing members 14 and 15, each of said members being connected between the driving unit and a mounting portion 16 of a vehicle body.

The weight of the driving unit is carried by the lower suspension members 12 and 13, each of which comprises both a resilient element and a rigid bracing element, as will appear presently; and hence the lower suspension members are connected to the driving unit at locations spaced to opposite sides of a vertical plane through the crankshaft axis, and also on or near the above mentioned plane normal to the crankshaft axis that extends through the longitudinal center of the crankshaft and contains, or is very close to, the center of gravity of the driving unit.

Specifically, each of the lower suspension members 12 and 13 comprises a pair of brackets 17 and 18 that respectively provide for connection of the member to the driving unit and to the vehicle body, a cushion 19 of a rubber-like material which is interposed between the brackets 17 and 18 to provide a yielding connection between them and which comprises the resilient element of the suspension member, and a strut 20 which comprises the rigid element of the suspension member and which extends through the cushion 19 with its axis substantially parallel to that of the crankshaft and has its ends articulately connected with the brackets 17 and 18.

Each of the brackets 17 and 18 has a flat, somewhat elongated base portion 21 and a lug-like apertured flange portion 22 which is perpendicular to the base portion and extends substantially across one end thereof. The base portion 21 of the bracket 17 is secured to the driving unit 5, while the base portion 21 of the bracket 18 is secured to the vehicle body engine mounting portion 16, with the base portions of the two brackets disposed generally parallel to one another and substantially normal to a line extending radially from the crankshaft axis through the suspension member. Apertured lobe-like projections 23 on the base portion 21 of each bracket are adapted to receive bolts or studs 23' by which the bracket is secured as just described.

The resilient cushion 19 is confined between and vulcanized or otherwise bonded to the opposing base portions 21 of the two brackets 17 and 18, and hence the cushion tends to hold said base portions in spaced apart parallel relationship but yieldingly allows the brackets to have limited motion in substantially all directions relative to one another. The strut 20 extends through a more or less closely fitting lengthwise hole in the cushion and has its opposite end portions articulately secured in the lug-like flange portions 22 of the two brackets 17 and 18 so that the strut will confine the brackets substantially only against relative motion in directions parallel to its length. The articulated connections between the end portions of the stud and the flange portions 22 of the brackets comprise a grommet-like bushing 24 of rubber-like resilient material received in the aperture in each flange portion 22, a spacer tube 25 in the bushing 22 and surrounding the end portion of the strut, and washers 27 and 28 confined against the ends of the spacer tube and in turn clampingly confining the enlarged end portions of the grommet-like bushing 24 against the opposite faces of the flange portion 22. The axially inner washer 27 is secured to the strut as by means of a weldment 29, and a nut 30 threaded onto the tip portion of the strut maintains the washers 27 and 28 in axial clamping engagement with the grommet-like bushing 24.

In the embodiment of the invention illustrated in FIGURES 1-5 the upper bracing members 14 and 15 comprise a pair of struts 31 and 32 which extend substantially parallel to the crankshaft axis. The front ends of the struts 31 and 32 are articulately connected to brackets 33 and 34, respectivtly, that are secured to the upper portion of the driving unit at opposite sides thereof; and their rear ends are similarly connected to brackets 36 and 37, respectively, that are attached to the vehicle body portion 16 behind the driving unit. The articulated connections between the end portions of the struts 31 and 32 and the brackets 33, 34, 36 and 37 can comprise grommet-like resilient bushings 39 and washers 40 in an arrangement similar to that on the end portions of the lower struts 20. The upper struts 31 and 32 cooperate with the lower struts 20 in substantially confining the driving unit to motion in directions parallel to the above mentioned plane normal to the crankshaft axis, and thus serve to absorb the torque reaction moments of the driving wheels upon the driving unit.

In many cases the lower suspension members 12 and 13 provide adequate yielding resistance to angular displacement of the driving unit about the crankshaft axis in reaction to crankshaft torque; but if desired an upper resilient member can be provided to cooperate with the lower suspension members for this purpose. As shown in FIGURES 1, 2 and 3 this upper resilient element can comprise a strut 42 which extends laterally from the drive unit, substantially parallel to the axis of the output drive shafts, and which is connected at its ends, by means of suitable brackets 43 and 44, with the driving unit and with the body portion 16. The connection between one end of the strut 42 and its adjacent bracket comprises a resilient cushion 45 of rubber-like material by which the upper portion of the driving unit is permitted to have yielding motion in directions parallel to the strut 42. Note that the connection between the strut 42 and the driving unit is in the vicinity of the above mentioned plane normal to the crankshaft axis and extending through the longitudinal center of the crankshaft.

FIGURES 6, 7, 8 and 9 illustrate a modified form of suspension means that allows the driving unit to have considerable movement in directions parallel to the plane just mentioned while substantially confining the driving unit against movement in other directions. In this case each of the lower suspension members 12' and 13' comprises a pair of L-shaped brackets 46 and 47 and a resilient cushion 48 confined between and secured to the two brackets as by vulcanizing. One leg 49 of the bracket 46 is suitably attached to the driving unit, as by bolts (not shown) or the like, and one leg 50 of the other bracket is similarly attached to the vehicle body mounting portion 16. The other legs 51 of the two brackets 46 and 47 are in opposed, spaced apart relationship, parallel to one another and substantially parallel to and near the above mentioned plane. The cushion 48 which is sandwiched between the legs 51 of the two brackets can comprise a single block of rubber-like material or, as shown, can comprise a plurality of discs 52 of such material alternating with and bonded to intermediate discs of metal.

The connection between the vehicle body portion 16 and the single upper suspension member 14' comprises a rigid beam 54 which has its opposite ends anchored to the body portion 16 and which extends transversely across the driving unit, and an inverted U-shaped yoke 55 that straddles the upper portion of the driving unit and has its legs secured thereto at opposite sides thereof. A cushion 56, which can be generally similar to the cushions 48 of the lower suspension members 12' and 13', is confined between and bonded to the beam and yoke respectively. Note that the three cushions 48 and 56 are on or closely adjacent to the plane normal to the crankshaft axis that contains the longitudinal center of the crankshaft and are also located at the apexes of a triangle which is indicated in construction lines in FIGURE 7.

From the foregoing description taken with the accompanying drawings it will be apparent that this invention provides an arrangement of the engine and transmissio of a motor vehicle driving unit of the character described whereby vibration and oscillation producing forces upon the driving unit tend to move it only in directions parallel to a plane normal to the axis of the engine crankshaft, and provides a suspension for such a driving unit whereby transmission of its vibration and oscillation forces to the body of a motor vehicle in which is mounted is minimized.

What is claimed as my invention is:

1. A motor vehicle having a body and a driving unit comprising a reciprocating engine with a crankshaft that has its axis parallel to a longitudinal axis of the vehicle and a pair of output drive shafts extending transversely to the crankshaft for transmitting power from the crankshaft to a pair of driving wheels on the vehicle that are positioned at opposite sides of the driving unit, said motor vehicle being characterized by:

(A) the center of gravity of the driving unit being in the vicinity of a plane normal to the crankshaft axis and through the longitudinal center of the crankshaft so that engine vibrations and crankshaft torque reactions produce substantially negligible oscillation of the driving unit about axes parallel to the drive shafts;

(B) elastic means so suspending the driving unit from the body as to provide substantial freedom of the driving unit for motion relative to the body in directions parallel to said plane; and (C) bracing means connected between the driving unit and the body for substantially precluding motion of the driving unit relative to the body in directions parallel to the crankshaft axis, the connections of said bracing means with the driving unit being at vertically spaced apart locations so that said bracing means cooperate to substantially prevent angular displacement of the driving unit about the drive shafts.

2. The motor vehicle of claim 1 further characterized by:

(A) said elastic means being connected with the driving unit substantially on said plane and comprising a pair of elastic suspension elements near the bottom of the driving unit, one at each side of a vertical plane containing the crankshaft axis, for yieldingly resisting angular displacement of the driving unit about the crankshaft axis in reaction to crankshaft torque; and (B) said bracing means comprising substantially rigid bracing elements having articulated connections with the driving unit and with the body.

3. A motor vehicle having a body and a driving unit comprising a reciprocating engine with a crankshaft that has its axis parallel to a longitudinal axis of the vehicle, a pair of output drive shafts extending transversely to the crankshaft axis for transmitting power to a pair of vehicle driving wheels positioned at opposite sides of the driving unit, and transmission means for transferring power from the crankshaft to the drive shafts, said motor vehicle being characterized by:

(A) a portion of the transmission means being disposed radially opposite the engine crankshaft, and the center of gravity of the driving unit being in the vicinity of a plane perpendicular to the crankshaft axis and through the longitudinal center of the crankshaft; and (B) means connecting the driving unit with the body comprising
(1) elastic suspension means attached to the driving unit at horizontally spaced apart locations that are substantially on said plane, for yieldingly resisting motions of the driving unit in directions parallel to said plane, and
(2) articulating means connected with the body and with the driving unit for substantially preventing motion of the driving unit relative to the body in other directions while permitting such motion in said directions, the connections of said last named means with the driving unit being at vertically spaced locations.

4. Means for mounting in a motor vehicle body a driving unit comprising a reciprocating engine with a crankshaft that has its axis parallel to a longitudinal axis of the vehicle, said mounting means comprising:

(A) yielding means connected with the body and with the driving unit at locations spaced to opposite sides of the crankshaft axis for supporting the weight of the driving unit while permitting restricted motion of the driving unit relative to the body in directions parallel to a plane normal to the crankshaft axis; and (B) a plurality of substantially rigid bracing means, each articulatedly connected to the body and to the driving unit at locations on an axis substantially parallel to that of the crankshaft, and the several bracing means being disposed in at least three mutually spaced apart locations so that they confine the driving unit to motion relative to the body in said directions.

5. The driving unit mounting means of claim 4, further characterized by:

(A) said yielding means comprising a plurality of resilient cushions; and (B) certain of said rigid bracing means comprising pairs of rigid members, one pair for each cushion, one rigid member of each pair being secured to the driving unit and the other to the body, and said members of each pair being secured to spaced apart portions of their cushion.

6. The driving unit mounting means of claim 5, further characterized by:

said rigid bracing means comprising a plurality of elongated struts, one for each pair of rigid members, each of said struts having its opposite ends articulatedly connected to the rigid members of its pair.

7. The driving unit mounting means of claim 5, further characterized by:

the rigid members of each of said pairs having opposed spaced apart portions aligned on an axis substantially parallel to that of the crankshaft and providing abutment surfaces normal to said axis to which portions opposite end portions of the cushion are anchored.

References Cited

UNITED STATES PATENTS

| | | | |
|---|---|---|---|
| 2,020,597 | 11/1935 | Appel | 248—7 XR |
| 2,060,784 | 11/1936 | Bent | 248—7 |
| 2,084,080 | 6/1937 | D'Aubarede | 180—64 |
| 2,086,370 | 7/1937 | Taub | 180—64 XR |
| 2,239,319 | 4/1941 | Halford et al. | 248—9 |

FOREIGN PATENTS

| | | |
|---|---|---|
| 1,307,384 | 9/1962 | France. |
| 1,357,185 | 2/1964 | France. |

BENJAMIN HERSH, *Primary Examiner.*

MILTON L. SMITH, *Assistant Examiner.*